United States Patent
Ausner et al.

(10) Patent No.: US 8,746,660 B2
(45) Date of Patent: Jun. 10, 2014

(54) MASS TRANSFER APPARATUS HAVING A STRUCTURED PACKING

(75) Inventors: Ilja Ausner, Öhningen (DE); Markus Duss, Winterthur (CH); Raymond Plüss, Kleinandelfingen (CH)

(73) Assignee: Solzer Chemtech AG, Winterthur (CH)

( * ) Notice: Subject to any disclaimer, the term of this patent is extended or adjusted under 35 U.S.C. 154(b) by 356 days.

(21) Appl. No.: 13/138,510

(22) PCT Filed: Mar. 17, 2010

(86) PCT No.: PCT/EP2010/053491
§ 371 (c)(1),
(2), (4) Date: Aug. 26, 2011

(87) PCT Pub. No.: WO2010/106119
PCT Pub. Date: Sep. 23, 2010

(65) Prior Publication Data
US 2011/0309536 A1    Dec. 22, 2011

(30) Foreign Application Priority Data
Mar. 18, 2009 (EP) .................... 09155551

(51) Int. Cl.
*B01F 3/04* (2006.01)
(52) U.S. Cl.
USPC .................... 261/112.2; 261/117
(58) Field of Classification Search
USPC ............... 261/108, 112.1, 112.2, 117
See application file for complete search history.

(56) References Cited

U.S. PATENT DOCUMENTS

| 3,281,307 A | 10/1966 | Moeller |
| 4,668,443 A | 5/1987 | Rye |
| 5,413,741 A * | 5/1995 | Buchholz et al. .......... 261/112.2 |

FOREIGN PATENT DOCUMENTS

| CN | 1 054 018 A | 8/1991 |
| DE | 22 19 130 B1 | 11/1973 |
| GB | 1 203 416 A | 8/1970 |

* cited by examiner

*Primary Examiner* — Robert A Hopkins
(74) *Attorney, Agent, or Firm* — Francis C. Hand; Carella, Byrne, et al

(57) ABSTRACT

An absorber or desorber contains a layer (10) for a structured packing which has corrugations, wherein a plurality of open channels (12, 14, 16) is formed by the corrugations, wherein the channels include a first corrugation valley (22), a first corrugation peak (32) and a second corrugation peak (42). The first corrugation peak (32) and the second corrugation peak (42) bound the first corrugation valley (22), wherein the first and second corrugation peaks have a first apex (33) and a second apex (43). An indentation (34) extending in the direction of the first apex (33) is formed on the first apex (33) of the first corrugation peak (32). The first corrugation valley (22) has a valley bottom (23), wherein the normal spacing (27) of at least one point of the indentation (34) from the valley bottom (23) of the corrugation valley (22) is smaller than the normal spacing (28) of the first apex (33) from the valley bottom (23) of the corrugation valley (22).

16 Claims, 11 Drawing Sheets

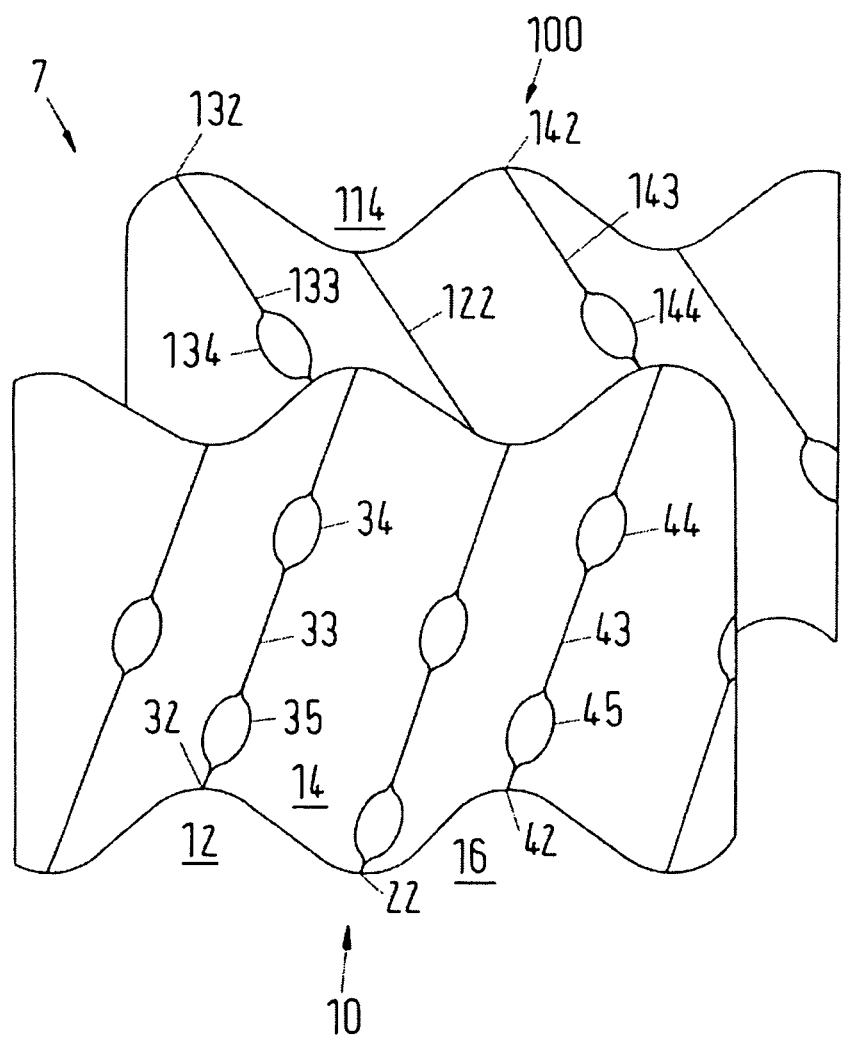

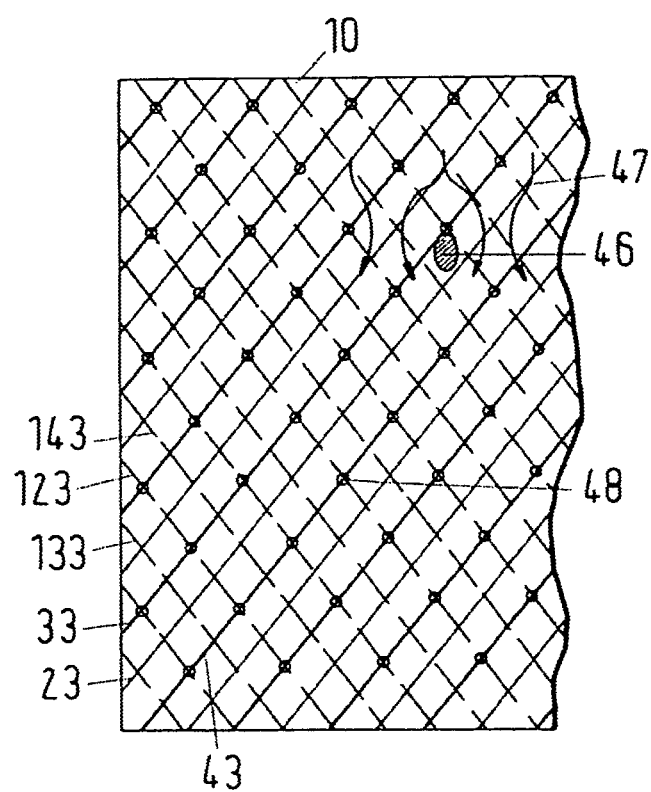

MASS TRANSFER APPARATUS HAVING A STRUCTURED PACKING

Figure 1:
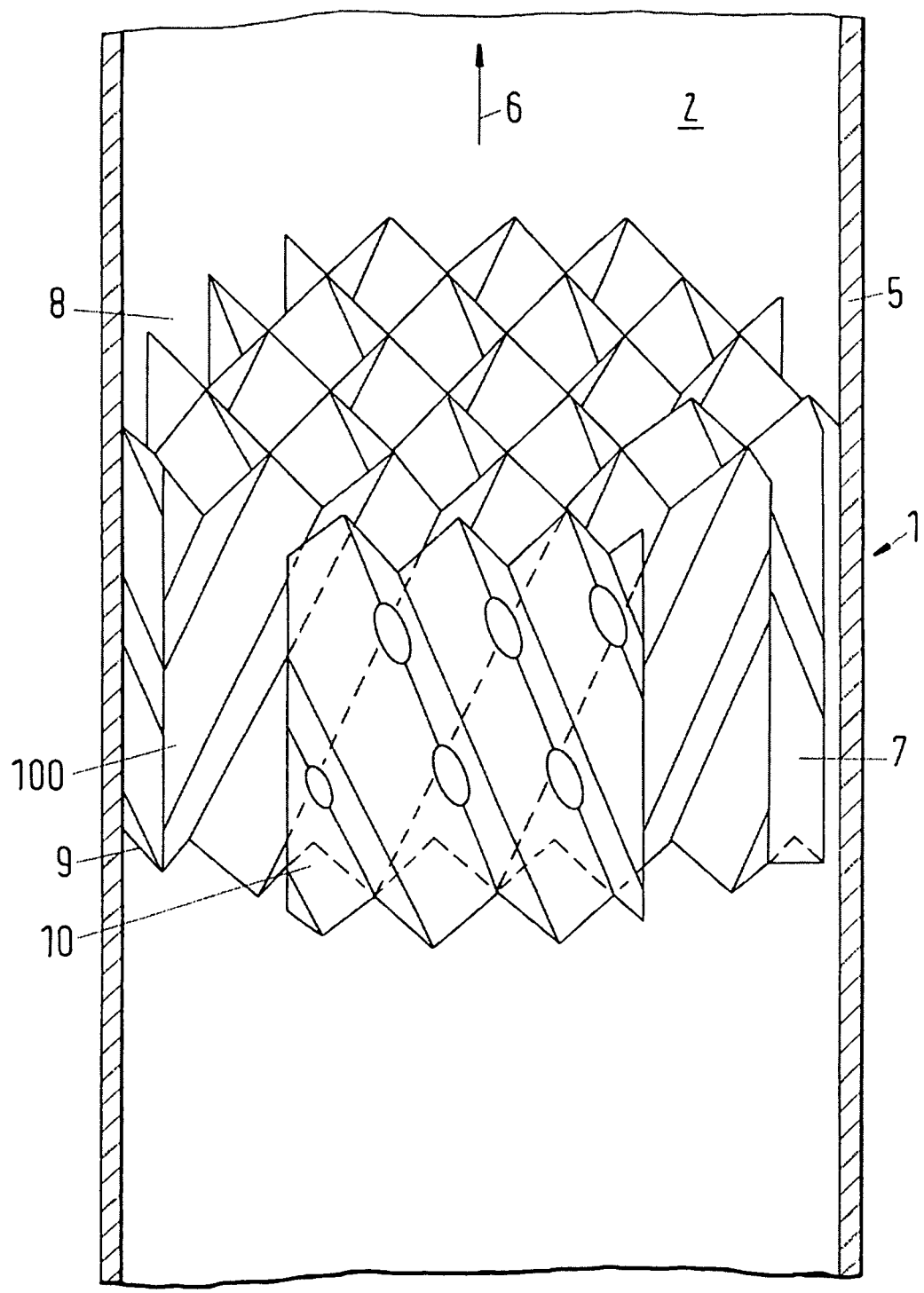

The invention relates to a structured packing as well as to a mass transfer apparatus which contains such a structured packing, for example an absorption column or a desorption column.

Structured packings are made in a commercial embodiment as folded metal sheets arranged one after the other whose structure has inclined channels which continuously cross one another. These channels positively influence the flows of the gas phase and the liquid phase within the packing and facilitate the mass transfer between the phases. That is, the gas phase and liquid phase are brought into contact in the channels of the packing and the mass transfer between the phases is thus facilitated.

To increase the separating capacity of a structured packing, the surface of the structured packing is usually enlarged, which is mostly achieved by a higher number of packing layers and/or tighter channel geometries. However, these measures result in an increase of the pressure drop in the structured packing. Therefrom follows, however, that less packing surface has to be provided for the reduction of the pressure drop, whereby the separating capacity, that is the efficiency of the packing, deteriorates. In addition, more open intersection channels can be provided. More open intersection channels means that the angle of inclination of the channels is selected to be lower with respect to the main direction of flow. This means that an optimum has to be found between the pressure drop and the best possible separating capacity dependent on the application.

The crossing channels, however, have a number of contact locations which can have a positive effect in some applications, but also a negative effect in other applications.

Dead zones can form downstream of the contact locations, viewed in the direction of the flowing liquid, with liquid taking part to a lesser extent in the mass transfer in said dead zones than the remaining liquid which is on the structured packing. This phenomenon is already known from U.S. Pat. No. 6,378,332 B1 in which a packing for cryogenic rectification is described which is intended to reduce the occurrence of such dead zones. The solution in accordance with U.S. Pat. No. 6,378,332 B1 lies in reducing the number of contact points between the layers by alternately high and less high folds of each individual layer A rectification process is thus known from U.S. Pat. No. 6,378,332 B1 in which a structured packing is used which has a cross-channel structure, that is it is made of corrugated or folded metal sheets which are placed over one another crosswise. Adjacent metal sheets contact one another along the corrugation peaks or along the edges. A more volatile liquid, in particular a gas phase can flow between the folded metal sheets in counterflow to a less volatile fluid, in particular a liquid phase with a mass transfer being able to take place. A process is shown in U.S. Pat. No. 6,378,332 B1 to reduce the number of contact points between two adjacent metal sheets. Provision is made for this purpose to vary the height of the corrugation peaks or of the edges such that only some of the corrugation peaks or edges of each metal sheet have the maximum height. The metal sheets thus only contact one another at maximum height along the corrugation peaks or edges.

A disadvantage of the packing proposed in accordance with U.S. Pat. No. 6,378,332 B1 is its insufficient mechanical stability. In addition, the volume filled up by the packing is not ideally corresponding to the geometrical transfer area due to the partially less high folds, consequently this construction design is accompanied by a loss of mass transfer area.

It is therefore the object of the invention to provide a structured packing which has an improved stability with the same number or a lower number of contact locations.

A further object of the invention is to improve the mass transfer in particular for an absorber or desorber in which the mass transfer rate is controlled by the liquid phase.

The solution includes an absorber or desorber, comprising a first layer for a structured packing having corrugations, wherein a plurality of open channels is formed by the corrugations. The first layer of the structured packing has a plurality of open channels including a first corrugation valley, a first corrugation peak and a second corrugation peak, wherein the first corrugation peak and the second corrugation peak bound the first corrugation valley, wherein the first and second corrugation peaks have a first apex and a second apex. An indentation extending in the direction of the first apex is formed on the first apex of the first corrugation peak, wherein the first corrugation valley has a valley bottom, wherein the normal spacing of at least one point of the indentation from the valley bottom of the corrugation valley is smaller than the normal spacing of the first apex from the valley bottom of the corrugation valley.

Furthermore a second layer is foreseen, whereby the second layer comprises corrugations, wherein the first layer and the second layer are arranged such, that the channels of the first layer cross with the channels of the second layer. The first layer is in contact with the second layer, whereby the contact is interrupted in the area of each of the indentations.

By making use of the indentations, an additional possibility for the guiding of the liquid flow is created as well as an arrangement of contact locations which enables the maximum wetting of the packing surface.

In accordance with a preferred embodiment, a second indentation is arranged on the second apex. Alternatively or additionally, a third indentation can be arranged on the first valley bottom. A plurality of first, second or third indentations can naturally be provided on the layer.

Each layer can include a first marginal boundary and a second marginal boundary, wherein the first marginal boundary is arranged substantially parallel to the second marginal boundary. A plurality of indentations can in particular be arranged between the first marginal boundary and the second marginal boundary.

For obtaining an improved stability with the same number or a lower number of contact locations, the packing has corrugations of a substantially constant corrugation height.

In accordance with a preferred embodiment, at least a part of the apex is made as an edge and/or at least some of the corrugated valleys are made in V shape.

A structured packing thus includes s first packing layer in accordance with any one of the preceding embodiments and a second layer, wherein the second layer has corrugations like the first layer, with the first layer and the second layer being arranged such that the channels of the first layer cross the channels of the second layer. The first layer is in touching contact with the second layer, preferably in that the apices of the corrugation peaks of the first layer and the apices of the corrugation valley of the second layer touch.

The indentations can be arranged on each of the first and second layers. The contact of the first layer to the second layer is interrupted by the indentations.

A packing in accordance with the invention is made up of structured packing layers whose folds are all of equal height. A high stability of the packing is hereby ensured which is in particular of special importance in columns with a large diameter. The reduction of the number of crossing points of the individual layers is realized in accordance with the invention by the introduction of indentations. These indentations can be formed as lenticular dents which can be applied, for example, by plastic deformation of the apex. The indentations are applied to specific points on the folded packing layers and the packing layers can thus be separated at a defined spacing and at defined points from one another.

As an alternative, the indentations can be made in the packing layer by provision of a hollow space in which an insert element can be applied.

Furthermore at least a part of the indentations extend over a length, which corresponds to at most 75% of the length of the apex. The indentation is arranged preferably between at least one of the first and second marginal boundaries, such that the marginal region is configured for a higher stability of the shape of the packing.

Each of the indentations can comprise an intermediate peak, in particular if the indentation extends to at most 75% of the length of the apex. The intermediate peak can then lie upon the apex of a neighboring layer or can be arranged in a distance to the neighboring layer.

Each of the layers can comprise an opening. Such an opening can facilitate the channel of gas and/or liquid to a neighboring channel. The openings can be foreseen in the wall section of the corrugation on the apices of the corrugation peaks or corrugation valleys or also in the section of the indentations.

Where possible, the manufacture of the indentation takes place together with the manufacture of the layer by a shaping process. The manufacture of the layer can thus take place with a minimal number of process steps. For this purpose, the indentations can be worked out of the sheet metal by pressing in, stamping in or deep drawing at defined points, e.g. at the upper edge and lower edge of the packing layer. When the individual layers are placed over one another, the channels do not touch one another respectively in the region of the indentations. There are no indentations in at least a respective two of the marginal regions either at the upper edge and lower edge of the layer or at the side edges of the layer so that sufficient contact locations, in particular contact points are present to keep the adjacent layers in the spacing from one another defined by the corrugation height. By the provision of a plurality of indentations within each of the marginal regions, a substantial reduction in the contact locations is effected as well as a maximization of the wetted packing surface with simultaneous stability of the individual layers and thus also of the packing body which is made up of the plurality of layers.

The spacing of individual packing layers remains constant even if the indentations are located on apices which bound the open channels. An apex can be understood either as a corrugation peak or as an edge, that is as a tip which is formed by two adjacent side surfaces of a channel.

The mass transfer takes place in a plurality of part steps running sequentially for the purification of a more volatile fluid, in particular of a gas. The components contained in the gas which are to be separated are transported to the interface of the liquid by convection and diffusion. The components subsequently have to pass through the interface and be taken up in the liquid. It is necessary to provide a mass transfer area for the liquid which is as large as possible so that the mass transfer can be improved.

A further object of the invention is to select the arrangement of the contact locations such that there is a minimal change of the mass transfer due to the contact locations.

The contact locations are in particular arranged increasingly in the marginal region of the first layer in the apparatus in accordance with any one of the preceding embodiments. In contrast to the prior art, in accordance with which a still uniform distribution of the contact locations is desired, but the number of contact locations is reduced, this uniform distribution of the contact locations over the surface of the packing can be fully dispensed with according to the invention. If the few contact locations are thus placed together more tightly, the flow restriction effects a backflow behind the contact locations, whereby the unwetted surface behind the contact location is reduced. Accordingly, there result a few contact locations with less unwetted surface and in sum a minimal ratio of unwetted area to total surface results.

In accordance with an advantageous embodiment of the apparatus, a plurality of indentations are located on each of the layers. In this case, all the layers have the same structure, which reduces the manufacturing effort and/or cost. The layers can be made continuously in this form in that a band is continuously folded and in the meantime the indentations are also produced. The folded band provided with indentations is cut to the desired dimensions. The band parts cut to size produce the layers, with each second layer being turned so that a cross-wise arrangement of layers arises when they are placed onto one another adjacent to one another.

A mass transfer apparatus, in particular a column, can include a structured packing in accordance with any one of the preceding embodiments.

A method for the purification of fluids in a mass transfer apparatus which contains a structured packing includes the steps: supplying a less volatile fluid to the mass transfer apparatus; distributing the supplied less volatile fluid over the surface of the packing; supplying a more volatile fluid into the mass transfer apparatus into a fluid inlet region; distributing the more volatile fluid in the gas inlet region over the surface of the packing, with the more volatile fluid flowing in counterflow to the liquid; collecting the more volatile fluid which exits the packing in a fluid outlet region, with the structured packing containing a first layer and a second layer, with the first layer and second layer having corrugations with a constant corrugation height, with open channels being formed by the corrugations, with the channels of the first layer crossing the channels of the second layer, with the more volatile fluid flowing through the channels from the fluid inlet region in the direction of the fluid outlet region, with the less volatile fluid surrounding the more volatile fluid which flows through the channels and flowing along the channel walls. The first layer is in touching contact with the second layer via the apices of the corrugation peaks so that a mass transfer takes place between the more volatile fluid and the less volatile fluid over the mass transfer area formed by the channels.

A maximum liquid wetting of the packing surface in mass transfer apparatus is made possible by use of indentations and by an arrangement of the contact locations.

The packing is preferably made of structured layers whose folds are all uniformly high. A high stability of the packing is hereby produced which is in particular of special importance in columns with a large diameter. The number of crossing points between the individual layers is reduced in accordance with the invention by the introduction of indentations at the apices of corrugation peaks of at least one of two respective layers.

Figure 2A:
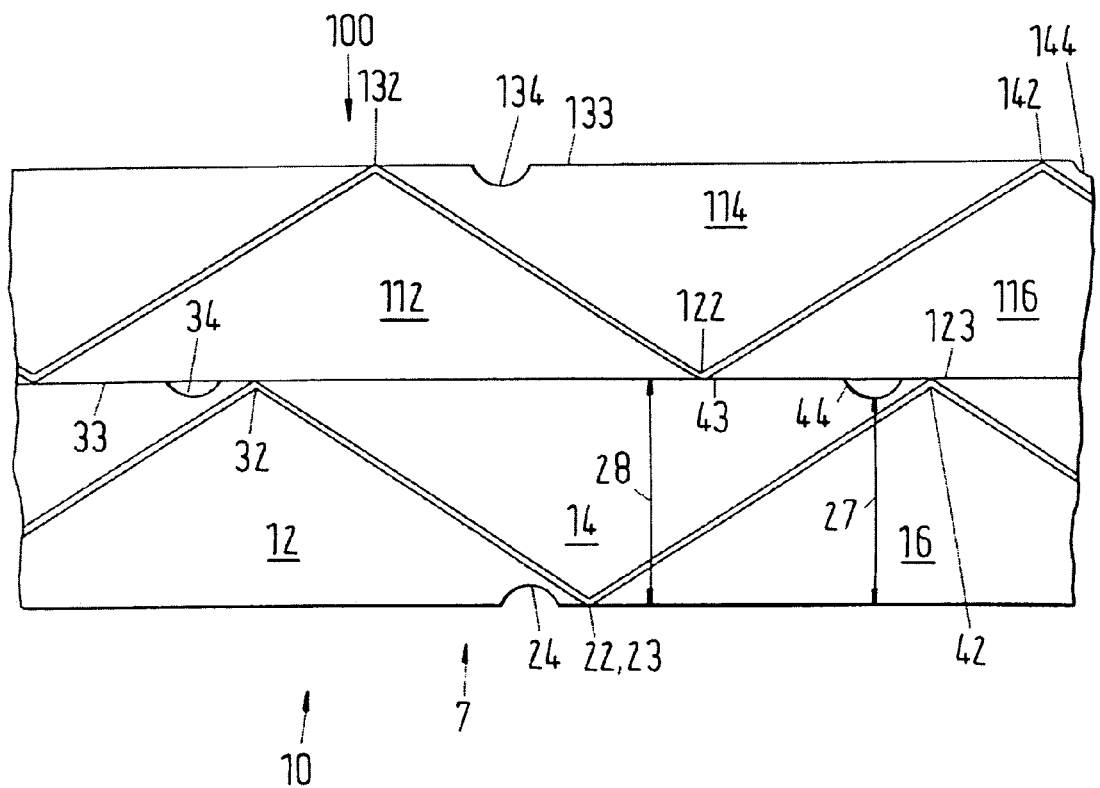
Figure 4:
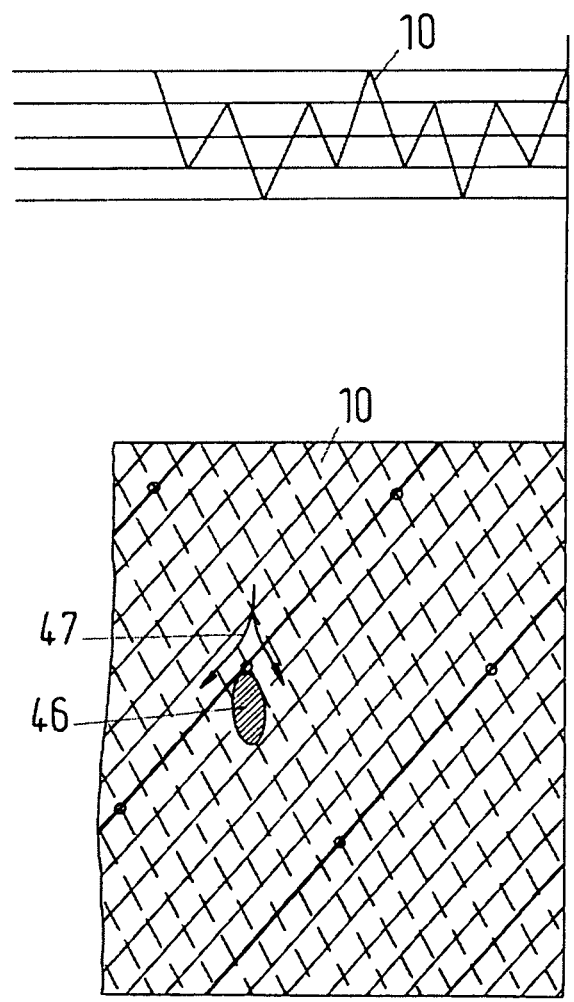
Figure 5:
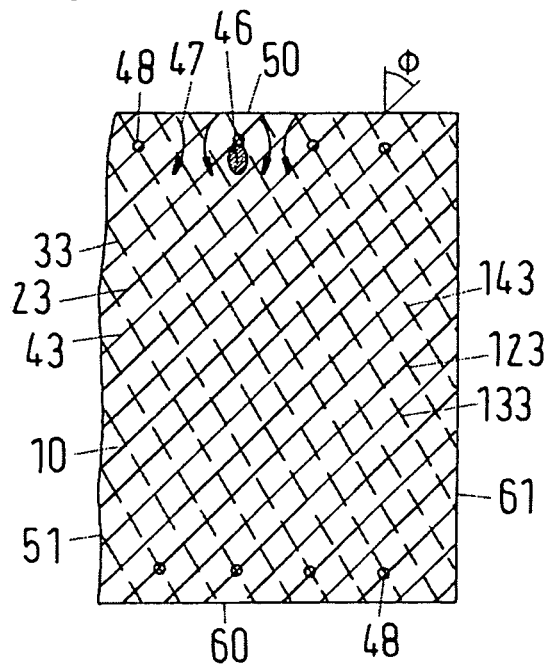
Figure 6:
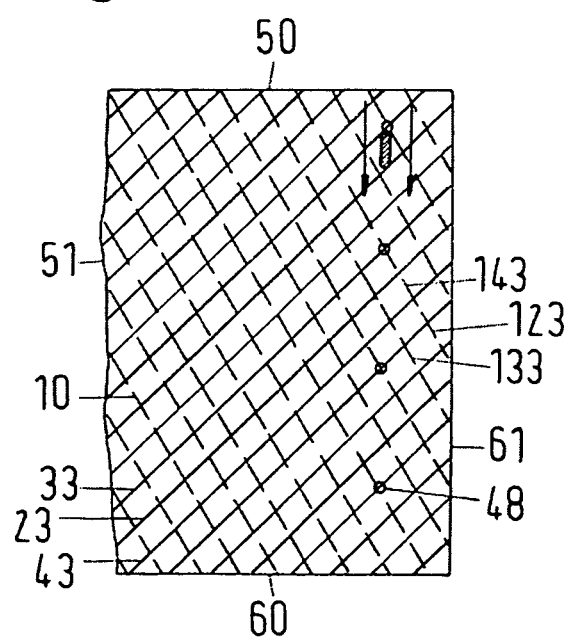
Figure 7A:
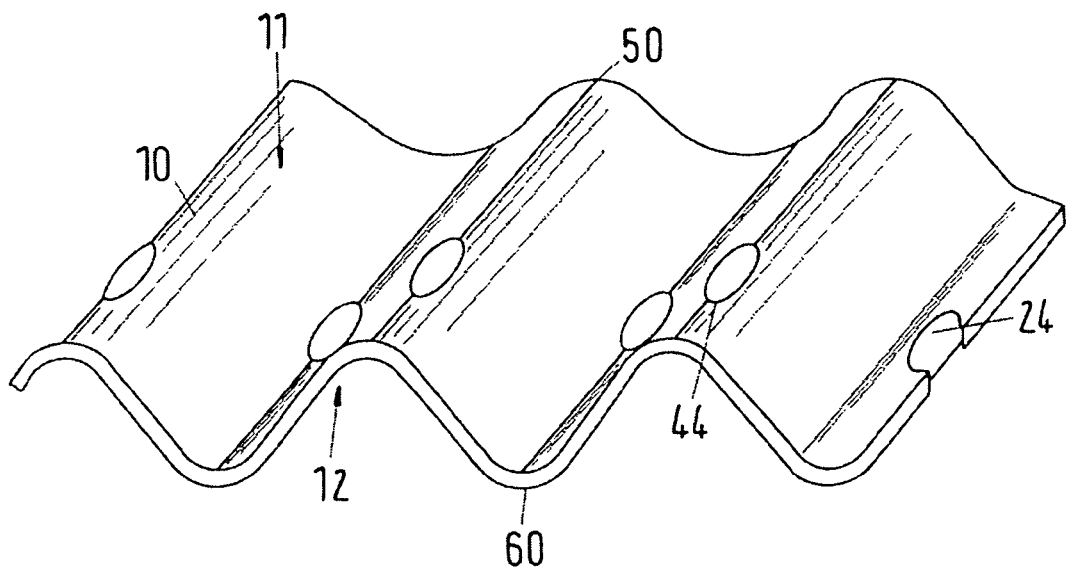
Figure 7B:
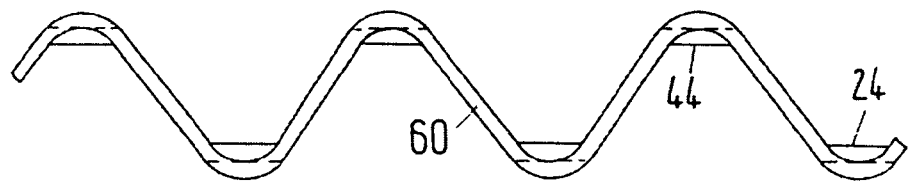
Figure 8A:
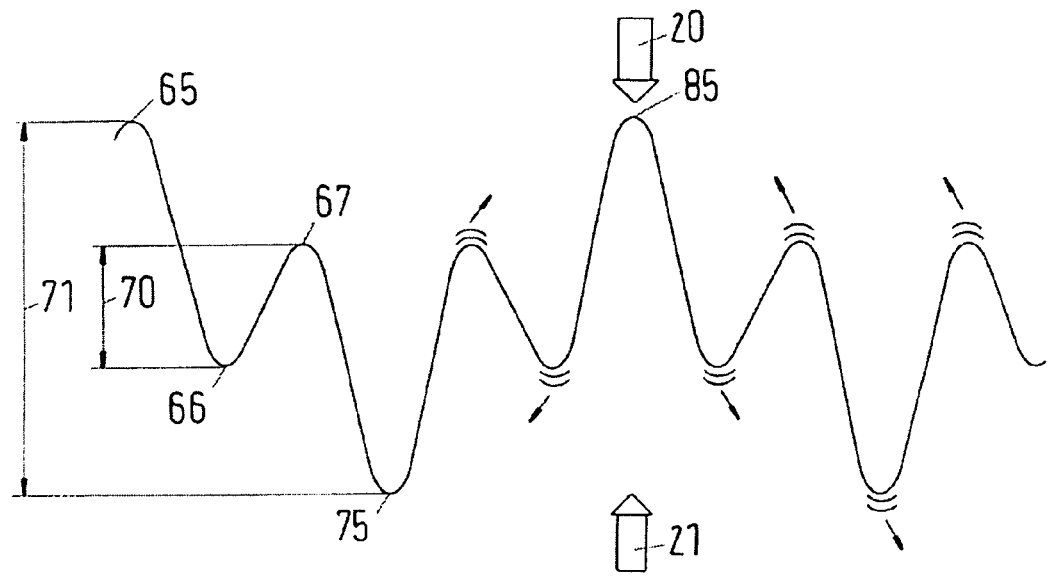
Figure 8B:
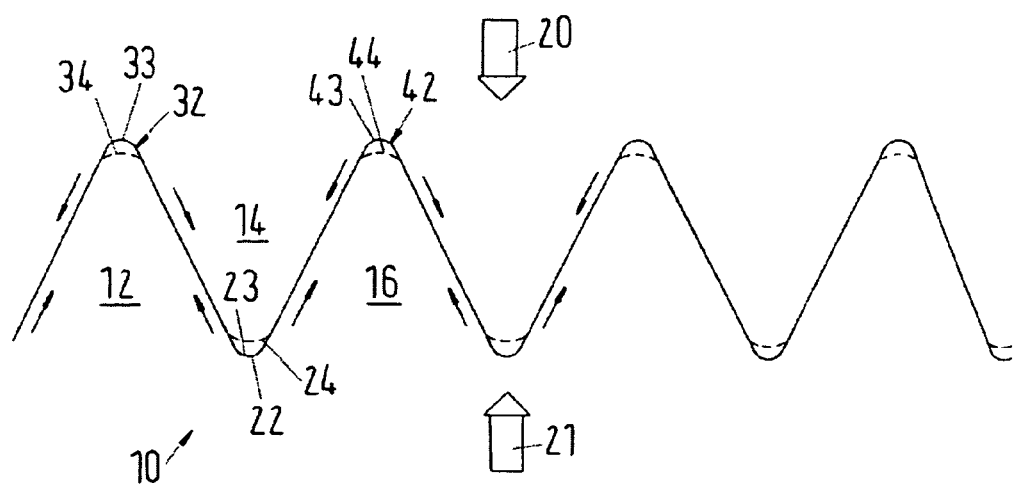
Figure 9:
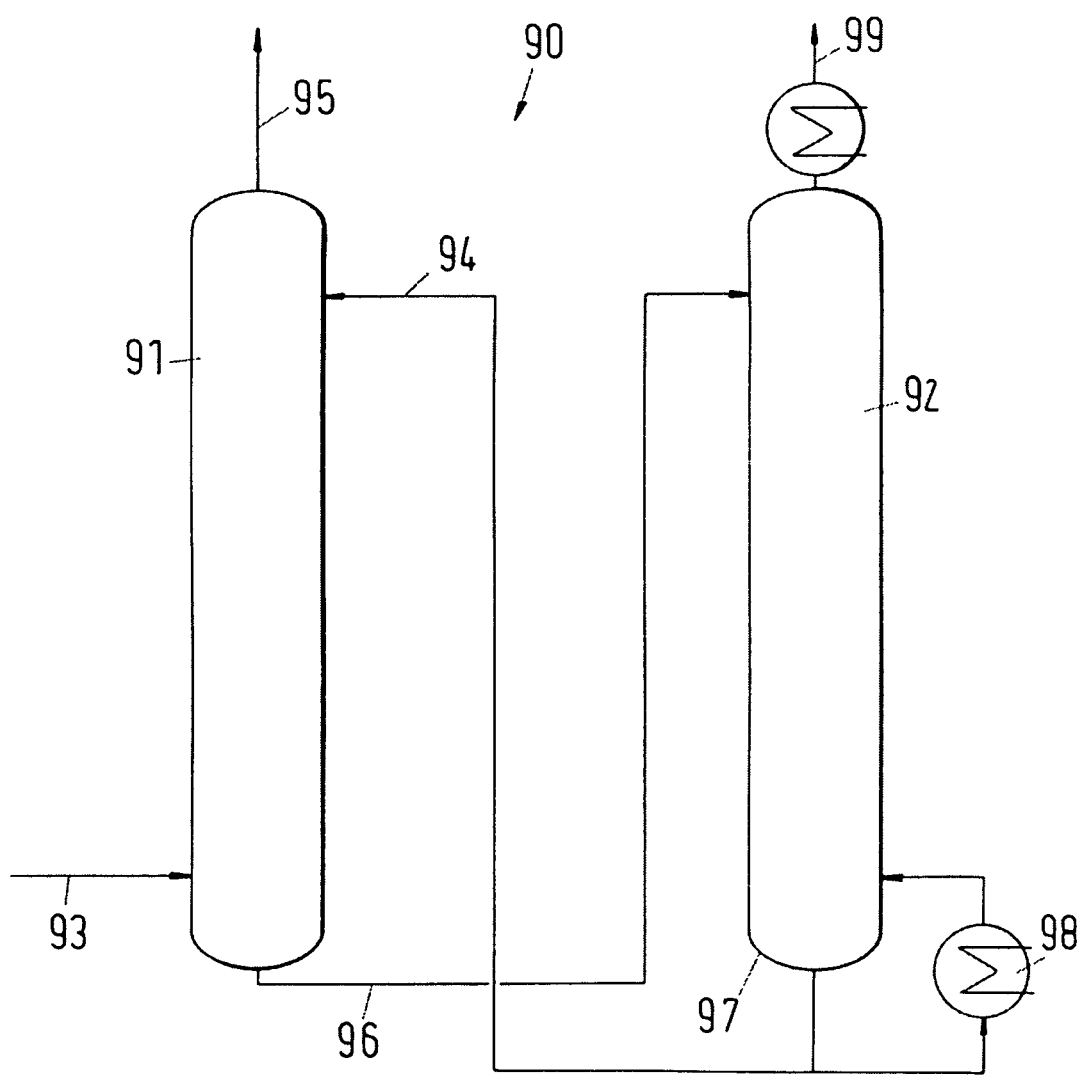

The invention will be explained in the following with reference to the drawings. There are shown:

FIG. 1 a view of an apparatus in accordance with the invention including a plurality of packing layers;

FIG. 2a a sectional representation through two adjacent packing layers in accordance with the invention;

FIG. 2b a view of two adjacent packing layers with corrugations in accordance with the invention;

FIG. 3 a representation of a conventional packing layer while indicating the flow path of the less volatile fluid, FIG. 4 a representation of the points of intersection in accordance with the solution of the prior art;

FIG. 5 a representation of the points of intersection of a first embodiment of the invention;

FIG. 6 a representation of the points of intersection of a further embodiment of the invention;

FIG. 7a a representation of a variant of the arrangement of the indentations in accordance with the invention on a layer in perspective;

FIG. 7b a view of the layer in accordance with FIG. 7a in the direction of the fold;

FIG. 8a an illustration of the deformation of the packing in accordance with the prior art under transverse load, FIG. 8b an illustration of the deformation of the packing in accordance with the invention under transverse load, FIG. 9 a representation of an absorption layer as an application example for the invention.

Figure 10:
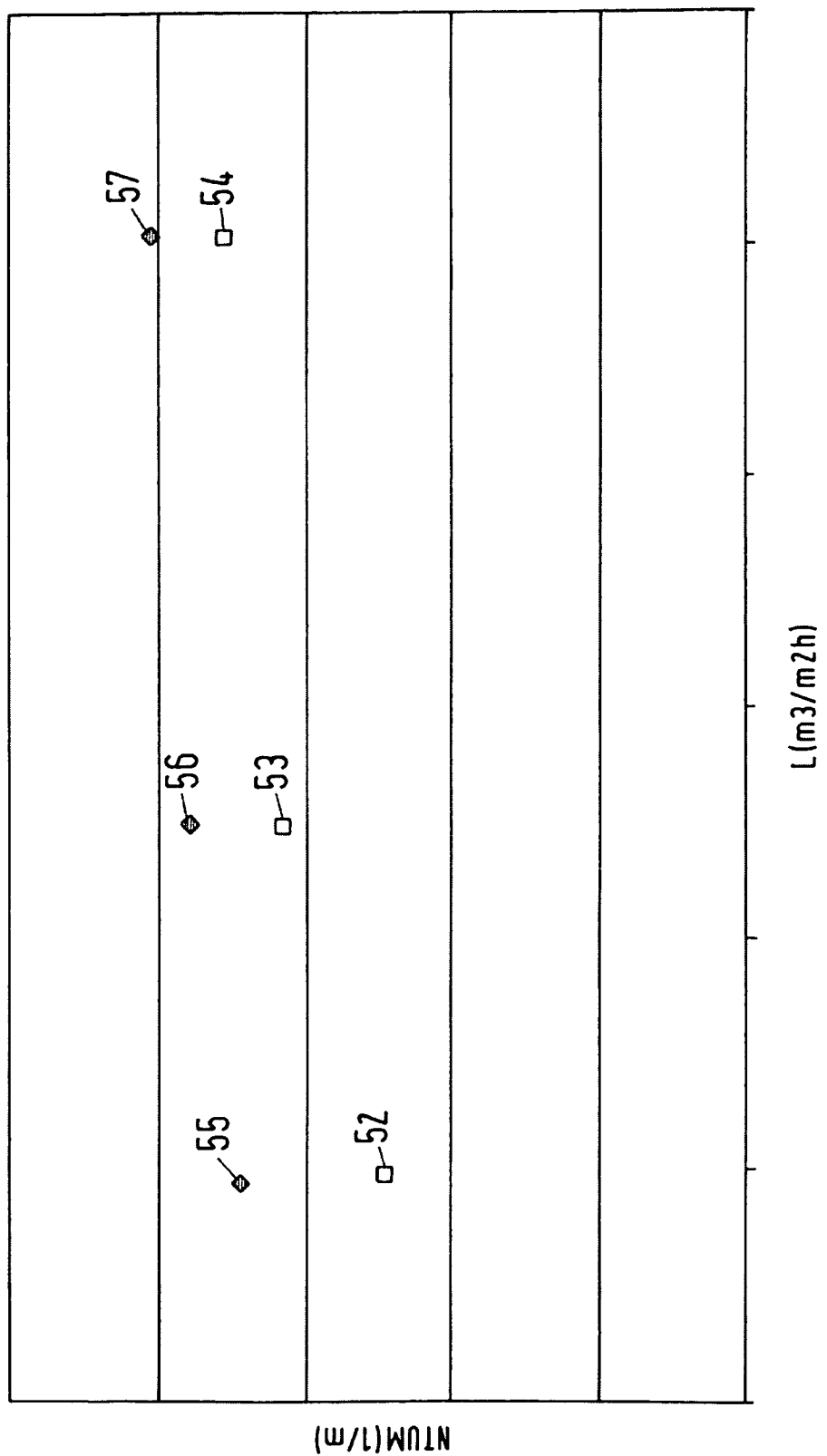
Figure 11:
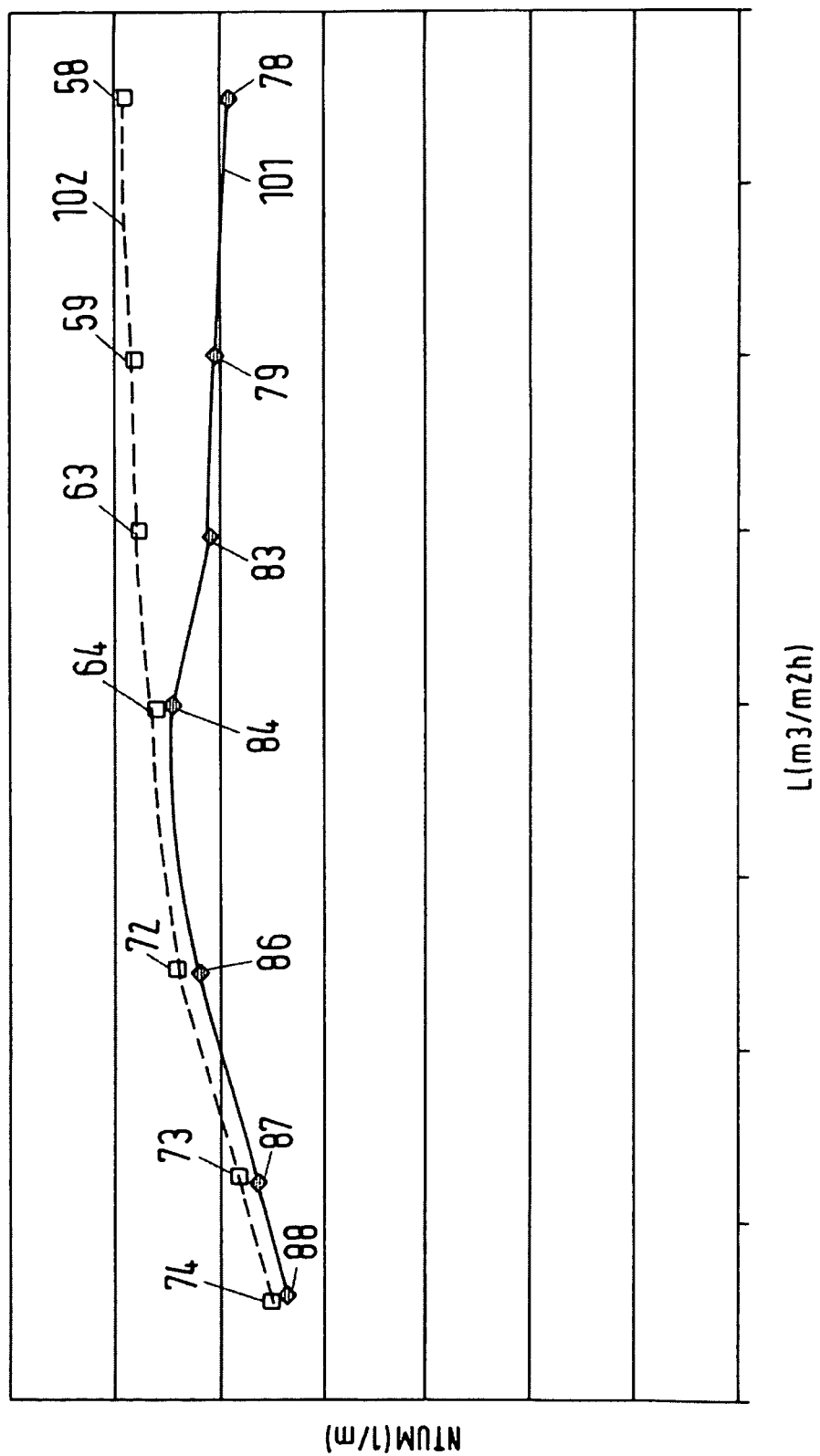

FIG. 10 a graphical representation of measuring values for the NTUM value for a gas phase side controlled absorption system or desorption system FIG. 11 a graphical representation of measuring values for the NTUM value for a liquid phase side controlled absorption system or desorption system FIG. 1 shows an apparatus 1 in accordance with the invention including some layers of a structured packing 7 which form a packing body. A means for mass transfer between two fluid phases is understood as a structured packing 7. The structured packing 7 is used in a mass transfer apparatus 2. The mass transfer apparatus can in particular be made as a column 5, which can be used for an absorption or a desorption.

The structured packing 7 is made of a plurality of layers which are in a regularly repeating geometrical relationship to one another. The spacing of adjacent layers can be selected as an example for this geometrical relationship. In accordance with the geometrical relationship, the spacings of adjacent layers from one another can periodically adopt the same value so that a structure arises from the sum of the layers which is characterized by the same or at least periodically the same spacings. The periodicity is found in the entire structured packing, whereby the packing is given a regular structure. The structure can in particular be made as corrugations.

In contrast thereto, bulk-fill body packings are made of bulk-fill bodies, that is of elements of the same geometrical structure, with, however, each bulk-fill body being able to have any desired spacings from adjacent bulk-fill bodies so that a periodicity of these spacings is not recognizable. The bulk-fill bodies are introduced into the column as fill. They form a heap on a column base. The heap is characterized by the random arrangement of the individual bulk-fill bodies.

The layers in accordance with FIG. 1 are made of thin-walled elements which have corrugations. The corrugations are characterized by a periodically repeating sequence of elevated portions, that is of corrugation peaks and valley-like depressions, that is corrugation valleys. These corrugations can in particular be made as a fold with a zigzag section with acutely converging edges. The layers are arranged with respect to one another so that the corrugations of two adjacent layers are inclined at an angle to the main direction of flow. The corrugations of adjacent layers are arranged cross-wise with respect to one another.

FIG. 2a shows two adjacent layers 10, 100 of the structured packing 7 in accordance with FIG. 1. A first layer 10 is arranged adjacent to a second layer 100. The first layer 10 and the second layer 100 can in particular include an element of sheet metal or of metal fabric; alternatively thereto, however, they can also include elements of plastic or of ceramic material. An element can in this respect include the total layer, but can also only form a part thereof. The element can have the form of a plate which includes corrugations, in particular a zigzag section or corrugations with rounded peaks and valley bottoms. The element can have coatings of plastics or ceramics to make the resistance of the layer toward chemical influences such as corrosion or thermal influences such as temperature or mechanical influences such as pressure more enduring.

The first layer 10 and the second layer 100 in FIG. 2a are shown in a view which shows a detail of the first surface 8 of the packing 7. The first surface 8 of the packing 7 is arranged substantially normal to the main direction of flow 6. The flow direction is called the main direction of flow 6 in which a more volatile fluid, in particular a gas, flows upwardly, that is in the direction of the head of the column 5, in the column without installations. Alternatively to this, the opposite direction can also be defined as the main direction of flow. In this case, the main direction of flow corresponds to the direction in which a less volatile fluid, that is usually a liquid, flows through the column without installations, that is in free fall. In the packing, the direction of flow locally deviates from the main direction of flow since the flow is deflected by the layers of the packing.

The first layer 10 of the structured packing 7 has corrugations, with a plurality of open channels 12, 14, 16 being formed by the corrugations. The channels include a first corrugation valley 22, a first corrugation peak 32 and a second corrugation peak 42. The first corrugation peak 32 and the second corrugation peak 42 bound the first corrugation valley 22. The first corrugation peak 32 and the second corrugation peak 42 have a first apex 33 and a second apex 43. An indentation 44 extending in the direction of the second apex 43 is formed on the second apex 43 of the second corrugation peak 42. The first corrugation valley 22 has a valley bottom 23. The first corrugation valley 22 has a valley bottom 23, wherein the normal spacing 27 of at least one point of the indentation 34 from the valley bottom 23 of the corrugation valley 22 is smaller than the normal spacing of the first apex 33 from the valley bottom 23 of the corrugation valley 22.

The normal spacing between the first apex 33 of the first corrugation peak 32 and the valley bottom 23 of the first corrugation valley 22 is called the corrugation height 28. The corrugation height 28 is accordingly larger than the normal spacing 27. In a layer in accordance with this invention, the valley height 28 is in particular substantially constant, that is it is in the range of the usual tolerances which lie in the region of 0.5 mm.

A first indentation 34 can also be arranged on the first apex 33. A second indentation 24 can selectively also be arranged on the first valley bottom 23.

The second layer 100 of the structured packing 7 has corrugations, with a plurality of open channels 112, 114, 116 being formed by the corrugations. The channels include a first corrugation valley 122, a first corrugation peak 132 and a second corrugation peak 142. The first corrugation peak 132 and the second corrugation peak 142 bound the first corrugation valley 122. The first corrugation peak 132 and the second corrugation peak 142 have a first apex 133 and a second apex 143. An indentation 134 extending in the direction of the first apex 133 is formed on the first apex 133 of the first corrugation peak 132. An indentation 144 extending in the direction of the second apex 143 is formed on the second apex 143 of the second corrugation peak 142. The first corrugation valley 122 has a valley bottom 123. The indentation 134 and the indentation 144 have a smaller normal spacing from the valley bottom 123 of the corrugation valley 122 than the second apex 143 of the second corrugation peak 142 from the valley bottom 123 of the corrugation valley 122. At least a part of the apex can be made as an edge. At least some of the corrugation valleys can be made in V shape. The normal spacing between the valley bottom and the apex is essentially the same for all corrugation peaks of the layer in accordance with FIG. 2a.

FIG. 2b shows two adjacent layers of a structured packing having corrugations according to which the apices do not form any acute edges, but are rather made as rounded portions. Reference is otherwise made to the description of FIG. 2a.

FIG. 3 shows the influence of the arrangements of the contact locations on the wettability of the surface of a layer, for example the layer 10 of the packing shown in FIG. 2a or FIG. 2b. FIG. 3a in this respect shows an arrangement in accordance with the prior art. The layer 10 covers the layer 100 which is not visible because it is behind it in the plane of the drawing. The first apex 33, the second apex 43 as well as the valley bottom 23 disposed therebetween are shown of the layer 10 by way of example. The first and second apices 33, 43 and the valley bottom 23 form fold edges. The apices 33, 42 lie on the valley bottom 123 which belongs to the layer 100. Each of the layers 10 and of the layers 100 naturally each contain a plurality of further apices and valley bottoms which are not designated in any more detail since they do not differ from the designated apices and valley bottoms. In FIG. 3, the lines belonging to the apices of the corrugation peaks are made thicker than the lines belonging to the valley bottoms. Furthermore, a long dashed line is provided for the apex of the corrugation peaks of the second layer 100 and a short dash dotted line for the valley bottoms of the layer 100. Contact points 48, which are marked by a circle in FIG. 3, arise at the points where a valley bottom of the layer 10 and an apex of the layer 100 meet. The contact points are distributed uniformly over the total surface in the two shown layers 10, 100.

It can be seen from FIG. 3 that the contact points are disposed very closely to one another, whereby a very high number of small zones 46 of unwetted surface and thus a relatively large portion of unwetted surface to the total packing surface result. In FIG. 3, only one single zone 46 is shown; the arrows 47 symbolize the flow of the less volatile fluid.

FIG. 4 shows the case in which the contact points are reduced, for example by a fold of the layers such as is proposed in U.S. Pat. No. 6,378,332 B1. Considerably fewer, but in return also larger, unwetted zones 46 admittedly result due to the flow of the less volatile fluid symbolized by means of arrows 47. The liquid flows are deflected further in this embodiment. In sum, a large portion of unwetted surface in the total surface of the layer 10 again results. The geometrical shape of the layers in accordance with FIG. 4 will be looked at in detail in FIG. 8a.

FIG. 5 shows an arrangement of the contact points 48 between two adjacent layers 10, 100 in accordance with the invention. The layer 100 is arranged behind the layer 10. Reference is made to FIG. 3 with respect to the representation. The number of contact points is reduced with respect to the surface of the layer 10. The contact points are in particular not distributed uniformly over the surface.

If the few contact locations are in contrast placed together more tightly, thus at a reduced distance to each other, the flow restriction effects a backflow behind the contact location, whereby the unwetted surface behind the contact location is in turn reduced. Accordingly, a few contact locations with less unwetted surface and in sum a minimal ratio of unwetted area to total surface of the layer result.

The layer 10 includes a first marginal boundary 50 as well as a second marginal boundary 60, with the first marginal boundary 50 being arranged substantially parallel to the second marginal boundary 60. With a vertical alignment of the layer, the marginal boundary 50 spans an upper interface and the second marginal boundary 60 spans a lower interface. The layer 10 furthermore includes a first marginal boundary 51 and a second marginal boundary 61. The first marginal boundary 51 and the second marginal boundary 61 extend adjacent to the inner wall of the mass transfer apparatus, in particular of the column, with a vertical alignment of the layer in a packing.

A gap at which at least one further packing is adjacent can adjoin at least one of the upper interface or of the lower interface.

The contact locations 48 are arranged in the proximity of the first and/or second marginal boundaries 50, 51, 60, 61. The adjacent layers contact one another at these contact locations. Further contact locations are at least partially avoided between these contact locations close to the marginal boundaries by application of indentations. A plurality of indentations which can have the same structure as one of the first, second or third indentations 24, 34, 44 in accordance with FIG. 2a or FIG. 2b is arranged between the first marginal boundary 50, 51 and the second marginal boundary 60, 61.

Indentations can naturally also be located in the proximity of at least one each of the first and second marginal boundaries.

In FIG. 6, a further variant is moreover shown in which the contact locations are not arranged next to one another, but over one another. Here, too, a liquid flow down along the contact locations effects a minimization of the unwetted area between the contact locations.

A view of a layer 10 in accordance with the invention is shown in perspective in FIG. 7a. FIG. 7b is a view of the layer in accordance with FIG. 7a in the direction of the fold. The associated structured packing 1 includes the first layer 10 and a second layer 100, with the second layer 100 preferably having corrugations like the first layer 10. The first layer 10 and the second layer 100 are arranged such that the channels of the first layer 10 cross the channels of the second layer 100. The first layer 10 is in touching contact with the second layer 100 via the apices of the corrugation valleys of the second layer 100 disposed opposite the corrugation peaks of the first layer 10. The first and second apices 33, 43, 133, 143 are arranged on each of the first and second layers 10, 100. The first and second apices 33, 43, 133, 143 which form contact locations are arranged as in FIG. 5 or FIG. 6. The contact locations are shown by a circle in these Figures. At the locations at which there is no circle, there is no touching point, but rather an indentation.

The second layer 100 is not shown graphically in FIG. 7 for reasons of simplicity. The indentations 24, 44 of the first layer 10 have at at least one point a spacing from the first and second apices, not shown, of the corrugation valleys of the second layer 100 which would be arranged at the top in FIG. 7. The indentations 44, which are disposed in the proximity of the first marginal boundary 50, are preferably arranged such that they are made as recessed portions on a first side 11 of the layer 10. The indentations 24 which are arranged between the first marginal boundary 50 and the second marginal boundary 60 are made as indentations on a second side 13 of the layer 10. The first side 11 of the layer 10 is arranged opposite the second side 13 and forms a respective one surface of the layer.

The indentations can in particular be arranged beneath one another with a vertical alignment of the first and second layers 10, 100. Alternatively to or in combination with this, the indentations can be arranged next to one another with a vertical alignment of the first and second layers.

Other indentations which do not have to be made as dents or not exclusively as dents can also be arranged along an apex of the layers 10, 100. Such an indentation can include a hollow space in which an insert element is contained with a section having a spacing from the apex of the adjacent layer. The section is made such that it at least sectionally falls below the normal fold height. Fold height is understood as the spacing between a corrugation peak and an adjacent corrugation valley. If the corrugation valley has a finite curvature at its apex, the spacing is defined as the normal spacing of the two apex point tangents disposed parallel to one another. If the curvature is infinite, that is the apex is acute and the highest point thus has no clearly defined tangent, a plane is placed through the highest point which contains all apex points of a side of the layer. A plane is likewise placed through the lowest point of a corrugation valley which contains all the points of the corrugation valley and of further corrugation valleys. The two planes should be parallel to one another. It follows from this that the fold height is the normal spacing between the two planes.

Indentations in accordance with any one of the preceding embodiments extend over a part of the apex or of the edge. The indentations can be manufactured by shaping, that is by pressing in, stamping or deep-drawing from the blank for the layer, for example from a packing metal sheet. The indentations are advantageously applied to one side on the apices of the corrugation peaks or of the valleys of the folds.

The advantage of this arrangement is that a blank can be manufactured endlessly long. Such a blank can be made of band material, for example as a plate-like metal sheet. Subsequently, portions of specific length are cut from the band material. These portions are converted into corrugations, for example by a bending process. Alternatively to this, band material is used which already has corrugations. The portion cut to length having the corrugations then forms the layer. A shaping procedure can be superimposed on these corrugations during the bending procedure so that the indentations are manufactured during the bending procedure. A first layer 10 and a second layer 100 are in turn placed over one another in a matching manner by turning all second corrugations. At least one row of indentations is located between all layers in the proximity of the upper and lower marginal boundaries and/or in the proximity of the lateral marginal boundaries.

The depth of the indentations preferably lies in the range from 10 to 30% of the layer height so that gaps result between the individual layers of just this value range. The gaps amount to a minimum of 1.5 mm for aqueous systems. Narrower gaps can be disadvantageous since liquid, in particular water, can be trapped between two adjacent edges, can remain there and can form a liquid bridge.

In FIG. 8a, a layer in accordance with a known construction shape having folds of variable height for the reduction of the contact locations is shown. The disadvantage of this construction shape is that the layer is compressed on loads on the upper side and lower side, with the arrows 20, 21 indicating the direction of force in which the layer is compressed. The folds include a first apex 65 and a second apex 85 as well as a corrugation valley 75 disposed therebetween. The first and second apices 65, 85 can be in contact with an adjacent layer, not shown. An intermediate corrugation valley 66 and an intermediate corrugation peak 67, which form a fold, are disposed between the first apex 65 and the valley bottom 75. The intermediate corrugation valley 66 has an intermediate valley bottom 68 and the intermediate corrugation peak 67 has an intermediate peak 69. The normal spacing 70 between the intermediate valley bottom 68 and the intermediate apex 69 is smaller than the normal spacing 71 between the apex 65 and the valley bottom 75. The normal spacing 70 is approximately half as big as the normal spacing 71 in the embodiment shown in FIG. 8a. A half-height fold is thus formed between the intermediate corrugation valley 66 and the intermediate corrugation peak 67. The half-height fold serves as a crumple zone and can be deformed. On the one hand, no stable packing body can be built by the deformation; on the other hand, the observation of a fixed layer height of the packing is not possible. The layer height corresponds to the previously defined normal spacing 71.

This problem can be avoided by a construction shape in accordance with the invention. As FIG. 8b shows, that a layer with indentations on each fold can be compressed much less and the layer can thus be exposed to higher loads on the upper side and lower side. This enables the design of stable packing bodies and ensures a substantially constant layer height to obtain a specified packing surface.

In addition, the surface of the indentations is available for the mass transfer. This means that a gain in mass transfer area is not only to be expected in comparison with the prior art, but also in comparison with conventional packings which have crossing layers with corrugations whose corrugation height is constant.

FIG. 9 shows an absorption system 90. The absorption system 90 includes two mass transfer apparatus, an absorber 91 and a desorber 92 which are in particular made as columns. One or more components from a gas flow are separated in the absorber 91 in the absorption system. For this purpose, a liquid solvent or absorbent is used. In the desorber 92, the solvent or absorbent is purified from the components taken up.

Both absorption and rectification are separation processes to separate one or more components from an existing feed flow 93. Rectification is used to separate liquid mixtures on the basis of different boiling points of the individual components, with rectification to be understood as continuous distillation which in particular includes a plurality of separating stages. In absorption, in contrast, one or more components are separated from a gas flow with the help of a suitable solvent or absorbent 94 and are thus separated from the gas flow. The overhead product of the absorber 91 is thus a purified gas flow 95. The bottom product 96 of the absorber 91 is an absorbent or solvent charged with the component or components. It can be sensible for economical, energetic or ecological reasons to purify the absorbent or solvent and to supply it again to the absorber as purified solvent or absorbent 94. The purification of the absorbent or solvent takes place in the desorber 92. The charged absorbent or solvent, that is the bottom product 96 of the absorber, forms the feed flow of the desorber. This feed flow is supplied to the desorber as a liquid in accordance with FIG. 10. The desorber 92 can contain one or more packings in accordance with any one of the preceding embodiments. The charged solvent or absorbent flows in the direction of the sump 95. The absorbent or solvent is evaporated at least partly in the sump, for which purpose a sump evaporator 98 is provided. The absorbent or solvent evaporated in the sump evaporator contains the components to be separated and absorbs the components to be separated during the rising in the column from the feed flow of the charged absorbent or solvent flowing in the direction of the sump. A gaseous part flow 99 thus arises in the desorber which is enriched with the components to be separated. These components to be separated can be separated either thermally, that is by condensation, or via other downstream separation steps, from the gaseous part flow 99.

Alternatively or in addition to this, expansion apparatus can be provided if the desorber should be operated at a lower pressure than the absorber or compression apparatus if the desorber has to be operated at a higher pressure than the absorber.

The mass transfer between the gas and the liquid generally takes place on the basis of a temperature drop from the sump to the head in both directions in rectification. The fluid with a higher boiling point condenses from the gaseous phase and is taken up in the liquid and the fluid with a lower boiling point evaporates from the liquid phase into the gaseous phase. In the absorption, the mass transfer only takes place in one direction; gas is absorbed by the liquid here.

The difference between rectification and absorption lies in the fact that the gas flow and the liquid flow are coupled to one another in rectification; in absorption, in contrast, both flows can be set independently of one another: in rectification a specific amount of liquid is evaporated and rises upward in the direction of the column head of the column. All the vapor is condensed at the column head and is conducted back into the column as a liquid flow again at least in part. The maximum conceivable liquid quantity would accordingly be the total condensed quantity of vapor which arrives at the column head. If more liquid is evaporated in the sump, more liquid can also flow back. Both flows are coupled to one another in this respect and the mass transfer depends decisively on the vapor flow. Rectification applications are accordingly controlled at the gas side as a rule.

In contrast to this, different operating conditions can be set in absorption applications with the help of pumps and fans: a large absorbent flow can be brought into contact with a relatively small gas flow or also vice versa. In addition, the absorbents can bind the gas components to them in different manners: physically, by a chemical reaction or both physically and chemically. In this respect, the selection of an absorbent or solvent for a specific gas component and the concentrations in the gas and the liquid are decisive for whether the mass transfer is controlled more at the gas side or more at the liquid side.

In order to check the applicability of the packing according to the invention a prototype of a packing has been manufactured which contains the indentations according to the invention to reduce the number of contact points. In the case investigated, the distance generated by the indentation between two corrugation peaks is 2.5 mm. The number of contact point thus reduced for the prototype from 37'500 m$^{-3}$ to 18'000 m$^{-3}$. Thus, a reduction of about 50% of the contact points is achieved compared to the prior art at the same total surface of 205 m$^2$/m$^3$.

This prototype is compared to a known packing without indentations, for instance a packing according to CH398503 having the same geometrical surface area. The indentations at the prototype reduce the number of contact locations. Furthermore, the gas flowing along the channels of a packing layer can be introduced partially as a side stream through the indentation into a neighboring channel in a cross-wise arranged packing layer. Due to this variation in the gas flow, a reduced separation efficiency is to be expected for the prototype.

The prototype mentioned above has been initially tested in an absorption column having in internal diameter of 300 mm. Isopropanol has been absorbed from air with water. Thereby a mainly gas side controlled system is obtained, similar to rectification. As expected, a smaller number of transfer units or NTUM (number of transfer units per meter) has been measured for the prototype, which is shown in FIG. 10 as a first series of measuring points 52, 53, 54. The larger the number of NTUM, the higher is the efficiency of the packing with respect to mass transfer. The graphical representation shows exemplarily the NTUM for a chosen F-factor of 1.5 Pa$^{0.5}$ for a packing according to CH398503 and the packing according to the invention. The liquid loading L has been varied. The F-factor is an indicator for the mean gas velocity in an empty column multiplied by the root of the density of the gas. The F-factor is proportional to the kinetic energy of the gas. The measuring points 55, 56, 57 for the known packing according to CH398503 show a higher NTUM value than the measuring points 52, 53, 54 of the packing according to the invention.

These previous findings indicate that the packing according to the invention with a reduced number of contact locations and larger distances between the packing layers reduces the pressure drop, but additionally leads to a decrease of the separation efficiency, which can be seen by the lower NTUM values of FIG. 10. Consequently such a packing appears not to be of a benefit for the absorption or rectification and thus materially differs from the packing shown in U.S. Pat. No. 6,378,322 B1, which is evidently advantageous for rectification.

Surprisingly it has been found in further trials, that there exist systems of substances, for which the packing according to the invention leads to an improved separation efficiency. The second investigated system of substances is the absorption of $CO_2$ from air with aqueous sodium hydroxide (NaOH), whereby the $CO_2$ is chemically bonded. FIG. 11 shows measuring points for this system with the prototype for liquid loads of about 10 to 80 m$^2$/m$^3$ h, whereby the measuring points 58, 59, 63, 64, 72, 73, 74 result in a higher NTUM value for the prototype than the measuring values 78, 79, 83, 84, 86, 87, 88 for the known packing. As shown in FIG. 11, the packing according to the invention leads with a reduced number of contact locations to at least the same separation efficiency as the reference packing. That means that the separation efficiency can be improved indeed by a reduction of contact locations and a suitable arrangement of contact locations. At the same time the pressure drop can be reduced by the use of the packing according to the invention. The lower curve of FIG. 11 shows the NTUM for a commercial structured packing according to CH398503 at increasing loading of the mass transfer apparatus with less volatile fluid at an F-Factor of 1.5 Pa$^{0.5}$, whereby the loading L is shown in m$^3$/m$^2$ h on the x-axis of the graphical representation. The upper curve 102 of FIG. 11 shows in comparison thereto the NTUM for a structured packing according to the invention. For all measuring points investigated at the same loading L, it results, that the NTUM is larger when a packing with indentations is used than when a packing without indentations is used.

The packing according to the invention has advantages in systems, which are to be found in the absorptive treatment of flue gases. In such systems, problematic components are to be extracted from the flue gas stream by means of reactive, aqueous solutions. The absorption of the $CO_2$, which may cause environmental damage, from power plant flue gases is named as an example. The absorption is performed with aqueous absorption means, which can contain organic or anorganic basic substances, such as MEA (monoethanolamine) or potassium carbonate.

The hypothesis why a reduction of the contact locations in particular applications results in a better absorption efficiency is therefore as follows: Due to the poor wetting properties of the liquids used, zones are formed behind the contact locations on the packing layer which are not wetted by the liquid at all. The total packing layer surface cannot be used to the full extent by the liquid. The liquid is hindered from flowing on at the contact locations, is retained and deflected to the sides. The same can also be observed when water flows down a planar surface as a film and the flow is suddenly disturbed by an object introduced (e.g. a finger placed on the plane). The film flow opens up behind the object and a dry, not wetted surface arises which is only wetted again as soon as the object is removed from the flow. For the use in absorption, in which the gas flow, which is impaired by the modification according to the invention has no negative effect onto the separation efficiency, an improved separation efficiency results. The system isopropanol from air in water, for which the mass transfer is controlled by the gas phase side, the degree of wetting has no remarkable influence on the mass transfer. In a system which the mass transfer is controlled by the liquid phase side, such as the absorption of $CO_2$ from air in liquid sodium hydroxide (NaOH) a complete wetting of the packing surface results in an increase of the NTUM.

The invention claimed is:

1. A structured packing comprising
   a first layer having a plurality of first corrugations forming a plurality of open channels therebetween, each said channel including a first corrugation valley having a valley bottom, a first corrugation peak having a first apex and a second corrugation peak having a second apex, wherein said first corrugation peak and said second corrugation peak bound said first corrugation valley;
   an indentation formed on said first apex of said first corrugation peak and extending in the direction of said first apex, at least one point of said indentation being spaced from said valley bottom of said corrugation valley a distance smaller than the spacing of said first apex from said first valley bottom of said first corrugation valley; and
   a second layer having a plurality of second corrugations forming a plurality of open channels therebetween, said second layer being disposed in contact with said first layer with said open channels of said first layer crossing said open channels of said second layer characterized in that said contact is interrupted in said indentation.

2. A structured packing as set forth in claim 1 further comprising a second indentation arranged on said second apex of said second corrugation peak of said first layer.

3. A structured packing as set forth in claim 2 further comprising a third indentation arranged on said valley bottom of said first corrugation valley of said first layer.

4. A structured packing as set forth in claim 1 wherein said first layer has a first marginal boundary and a second marginal boundary parallel to said first marginal boundary.

5. A structured packing as set forth in claim 4 further comprising a second indentation arranged on said second apex of said second corrugation peak of said first layer and a third indentation arranged on said valley bottom of said first corrugation valley of said first layer, each of said first indentation, said second indentation and said third indentation being arranged between said first marginal boundary and said second marginal boundary.

6. A structured packing as set forth in claim 5 wherein at least one of said first indentation, said second indentation and said third indentation is made as a lenticular dent.

7. A structured packing as set forth in claim 1 wherein the spacing of said first apex from said first valley bottom of said first corrugation valley is constant.

8. A structured packing as set forth in claim 1 wherein at least a part of said first apex is made as an edge.

9. A structured packing as set forth in claim 1 wherein at least a part of said first corrugation valley is made in V shape.

10. A structured packing as set forth in claim 1 wherein each said channel of said second layer includes a first corrugation valley having a valley bottom, a first corrugation peak having a first apex and a second corrugation peak having a second apex, wherein said first corrugation peak and said second corrugation peak bound said first corrugation valley; and an indentation formed on said first apex of said first corrugation peak and extending in the direction of said first apex, at least one point of said indentation being spaced from said valley bottom of said corrugation valley a distance smaller than the spacing of said first apex from said first valley bottom of said first corrugation valley.

11. A structured packing as set forth in claim 1 wherein said indentation extends over a length which amounts to at most 75% of the length of said first apex of said first corrugation peak.

12. A structured packing as set forth in claim 1 wherein said indentation comprises an intermediate peak.

13. A structured packing comprising
   a first layer having a plurality of first corrugations forming a plurality of open channels therebetween, each said channel including a first corrugation valley having a valley bottom, a first corrugation peak having a first apex and a second corrugation peak having a second apex, wherein said first corrugation peak and said second corrugation peak bound said first corrugation valley;
   a plurality of indentations formed on said first apex of said first corrugation peak and extending in the direction of said first apex, at least one point of each said indentation being spaced from said valley bottom of said corrugation valley a distance smaller than the spacing of said first apex from said first valley bottom of said first corrugation valley;
   a second layer having a plurality of second corrugations forming a plurality of open channels therebetween, each said channel including a first corrugation valley having a valley bottom, a first corrugation peak having a first apex and a second corrugation peak having a second apex, wherein said first corrugation peak and said second corrugation peak bound said first corrugation valley;
   a plurality of indentations formed on said first apex of said first corrugation peak of said second layer and extending in the direction of said first apex thereof, at least one point of each said indentation being spaced from said valley bottom of said corrugation valley a distance smaller than the spacing of said first apex from said first valley bottom of said first corrugation valley; and
   said second layer being disposed in contact with said first layer with said open channels of said first layer crossing said open channels of said second layer with said indentations of said first layer being arranged at least partially overlapping with said indentations of said second layer to define gams between said first layer and said second layer.

14. A structured packing comprising
   a first layer having a plurality of first corrugations forming a plurality of open channels therebetween, each said first corrugation having an apex;

a plurality of indentations formed in said apex of at least one of said first corrugations and extending in the direction of said first apex; and a second layer having a plurality of second corrugations forming a plurality of open channels therebetween;

said second layer being disposed in contact with said first layer with said first corrugations of said first layer crossing said second corrugations of said second layer and with said indentations of said first layer defining gaps between said first layer and said second layer.

15. A structured packing as set forth in claim 14 wherein said plurality of indentations are formed in said apex of a plurality of said first corrugations.

16. A structured packing as set forth in claim 14 wherein each said channel of said first layer includes a first corrugation valley having a valley bottom, a first corrugation peak having a first apex and a second corrugation peak having a second apex, wherein said first corrugation peak and said second corrugation peak bound said first corrugation valley and wherein at least one point of each said indentation is spaced from said valley bottom of said corrugation valley a distance smaller than the spacing of said first apex from said first valley bottom of said first corrugation valley.

* * * * *

UNITED STATES PATENT AND TRADEMARK OFFICE
CERTIFICATE OF CORRECTION

| | | |
|---|---|---|
| PATENT NO. | : 8,746,660 B2 | Page 1 of 1 |
| APPLICATION NO. | : 13/138510 | |
| DATED | : June 10, 2014 | |
| INVENTOR(S) | : Ilja Ausner et al. | |

It is certified that error appears in the above-identified patent and that said Letters Patent is hereby corrected as shown below:

In the Claims

Column 14, line 62, "gams" should be --gaps--

Signed and Sealed this
Twenty-sixth Day of August, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,746,660 B2 |
| APPLICATION NO. | : 13/138510 |
| DATED | : June 10, 2014 |
| INVENTOR(S) | : Ilja Ausner et al. |

It is certified that error appears in the above-identified patent and that said Letters Patent is hereby corrected as shown below:

Title Page, item (73) Assignee: "Solzer Chemtech AG" should be --Sulzer Chemtech AG--

Signed and Sealed this
Twenty-fifth Day of November, 2014

Michelle K. Lee
*Deputy Director of the United States Patent and Trademark Office*